Figure 1:
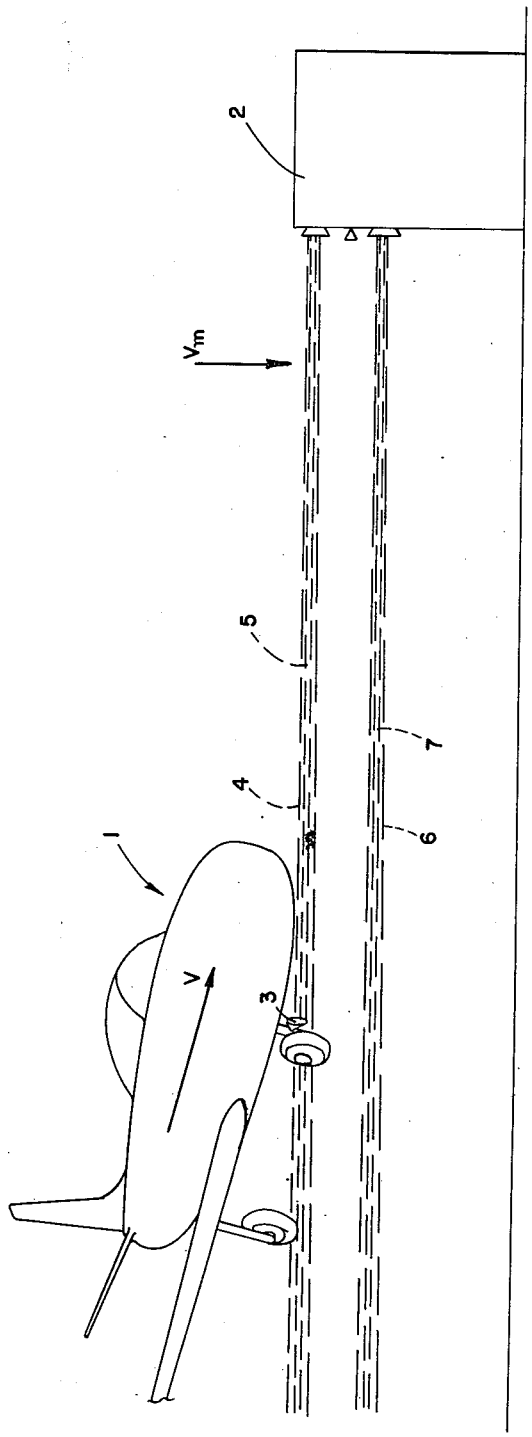

INVENTORS
RALPH H. OSTERGREN
ROBERT B. HORSFALL, JR.
SYDNEY J. GOLDBERG
JOHN M. WUERTH

BY

William R. Lane

ATTORNEY

Nov. 6, 1956  R. H. OSTERGREN ET AL  2,769,492
VELOCITY METER
Filed July 21, 1952  4 Sheets-Sheet 2
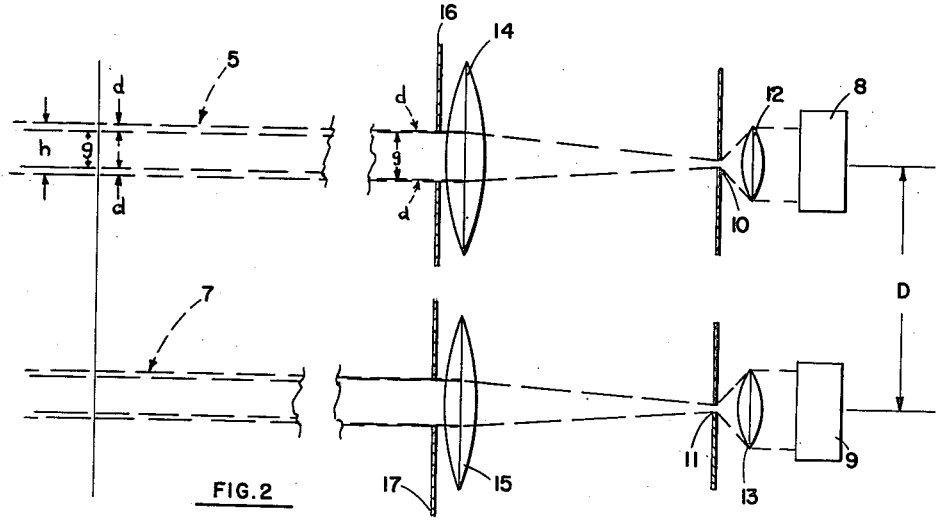
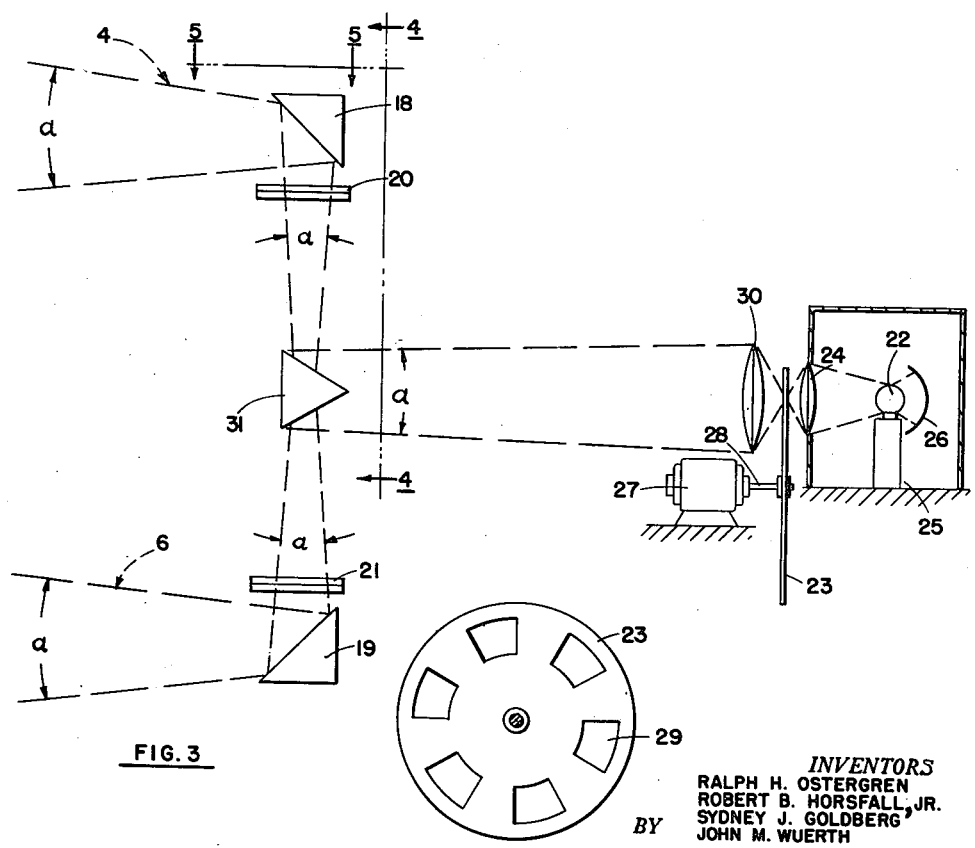
INVENTORS
RALPH H. OSTERGREN
ROBERT B. HORSFALL, JR.
SYDNEY J. GOLDBERG
JOHN M. WUERTH
BY
William R. Lane
ATTORNEY Nov. 6, 1956  R. H. OSTERGREN ET AL  2,769,492
VELOCITY METER
Filed July 21, 1952.  4 Sheets—Sheet 3
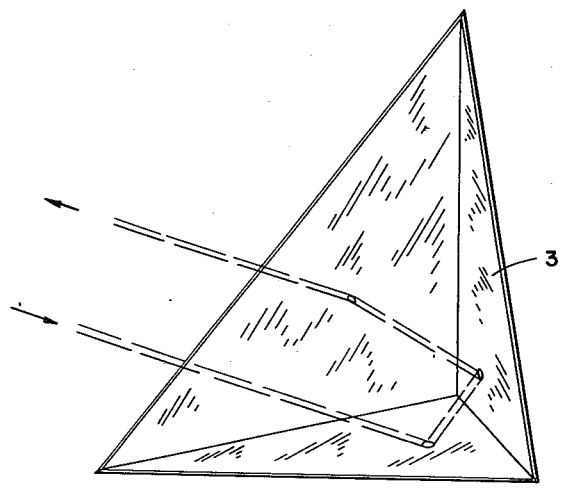
FIG. 7
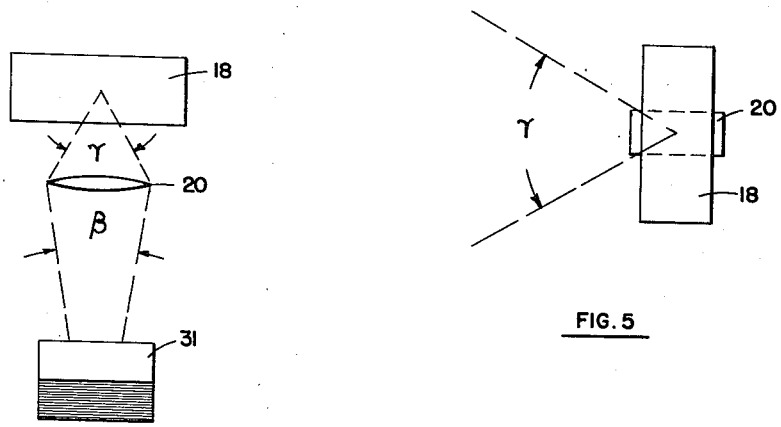
FIG. 4
FIG. 5
INVENTORS
RALPH H. OSTERGREN
ROBERT B. HORSFALL, JR.
SYDNEY J. GOLDBERG
JOHN M. WUERTH
BY William R. Lane
ATTORNEY

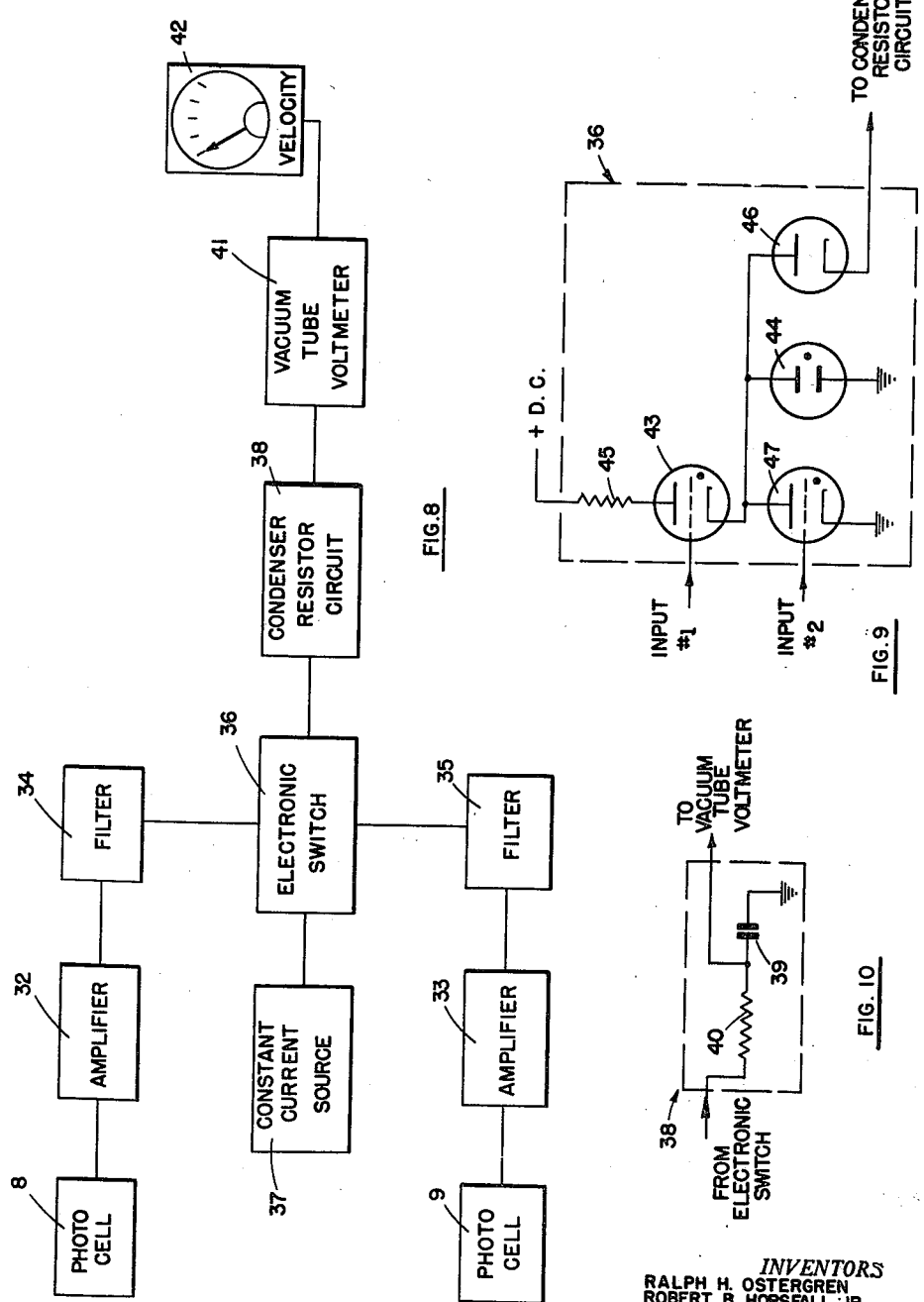

United States Patent Office 2,769,492
Patented Nov. 6, 1956

2,769,492
VELOCITY METER

Ralph H. Ostergren, Fullerton, Sydney J. Goldberg, Los Angeles, and Robert B. Horsfall, Jr., and John M. Wuerth, Whittier, Calif., assignors to North American Aviation, Inc.

Application July 21, 1952, Serial No. 299,982

14 Claims. (Cl. 161—18)

This invention relates to means for determining the component of velocity of a moving object in a specific direction, and more particularly to means for determining the component of aircraft velocity normal to or the component of aircraft velocity parallel to a runway during landing operations.

It is necessary to limit the velocity shock of heavy aircraft, at the moment of touchdown, to a predetermined maximum value in order to avoid exceeding the design limits of the landing gear. Pilots must be trained to limit the vertical velocity of their aircraft relative to the landing surface. The problem is particularly critical when an aircraft is landing upon a rising flight deck of an aircraft carrier. The device of this invention is used ts a pilot training device to measure the vertical velocity of the aircraft at the moment of touchdown. This invention is not, however, limited to measuring aircraft velocity, but may also be used to measure velocities of other objects.

The invention contemplates two or more optical systems which are sensitive to light sources within each of two or more layers or regions of sensitivity, which regions are perpendicular to the velocity component which is to be measured, and which are separated by known constant distances. In the preferred embodiment, modulated illumination is radiated into each of the sensitive layers, and a retroflective element such as a triple mirror, corner reflector, or trihedral prism is mounted on the object whose velocity is being measured, and which is hereinafter designated as the vehicle. As the vehicle passes through each sensitive region, the retroflective element returns a portion of the modulated illumination to the optical system associated with that particular sensitive region. The light so returned is detected photoelectrically, is identified by its modulation frequency, and is used to trigger a circuit which, in turn, starts a timer as the first successive layer or region of sensitivity is intercepted, and is used to stop the timer when the second successive region of sensitivity is intercepted.

It is therefore an object of this invention to provide optical and electrical means for measuring one component of the velocity of a moving body.

It is another object of this invention to provide optical and electrical means for measuring the rate of descent normal to a runway surface of an aircraft at the instant of touchdown.

It is another object of this invention to provide optical and electrical means for measuring the component of velocity of an aircraft parallel to the runway surface.

Other objects of the invention will become apparent from the following description taken in connection with the accompanying drawings, in which Fig. 1 is a perspective view of this invention;
Fig. 2 is a diagram of the optical sensing system of a preferred embodiment of this invention;
Fig. 3 is a diagram of a light projection system used in the preferred embodiment of this invention;
Fig. 4 is a view of Fig. 3 taken at 4—4;
Fig. 5 is a view of Fig. 3 taken at 5—5;
Fig. 6 is a plan view of a typical light-chopping disc of this invention;
Fig. 7 is a triple mirror type retroflective element showing how a beam of light is reflected;
Fig. 8 is a block diagram of a preferred embodiment of the electronic portion of this invention;
Fig. 9 is a schematic diagram of an electronic controlled switch; and
Fig. 10 is a schematic diagram of a condenser-resistor combination.

In Fig. 1, aircraft 1 is depicted just prior to touchdown. Velocity measuring device 2 measures the component $V_m$ of velocity $V$ in the vertical direction. When retroflective element 3 passes simultaneously through light 4 and optical sensing layer 5, the reflected light from retroflective element 3 starts a timer in device 2. When retroflective element 3 passes simultaneously through light 6 and optical sensing layer 7, the reflected light from retroflective element 3 stops the timer in device 2. The average velocity of retroflective element 3 in the direction of $V_m$ is reciprocally related to the measured time of the timer of device 2, and is read directly from a calibrated scale.

In Fig. 2, two optical systems, spaced apart by a known distance D, are enclosed in device 2 of Fig. 1. Both optical systems are identical and therefore only one optical system will be explained.

The field of view of each optical system is shown in elevation in Fig. 2. Each field of view is very thin in elevation, for example, of the order of 0.5 inch; while in the plan view, which is not shown, the field of view is sufficiently broad to intercept the object or vehicle whose velocity is being measured, despite a large component of velocity thereof in a horizontal direction. The component of velocity which is measured by this invention is that component which corresponds to a direction parallel with the measured distance D. It is readily seen that the optical systems of Fig. 2 may be oriented in any direction in space. For instance, the sensitive direction as measured by the distance D may be turned horizontally to measure a horizontal component of velocity, or it may be turned vertically to measure a vertical component of velocity.

The optical systems of Fig. 2 may be best explained by considering photosensitive device 8 to be replaced by a source of light as if the optical system were to be used to project light rather than to receive light. It is readily understood that for purposes of explanation of a light-receiving system, light rays are considered to behave the same no matter which direction they are traveling. Considering photosensitive device 8 as if it were a source of uniformly-distributed light, the light is focused upon slit 10 by means of lens 12. Slit 10 is very narrow, for example, of the order of 0.001 inch.

The geometrical image of slit 10 will first be considered. Lens 14 focuses the geometrical image of slit 10 at the maximum design range of this invention, for example, 300 feet. If the distance between slit 10 and lens 14 is approximately one foot, the height of the geometrical image of slit 10 at the range of 300 feet is approximately 0.3 inch.

Because of the small size and the sharp edges of slit 10, a diffraction pattern is generated at each edge of the geometrical image. The height of each projected diffraction pattern at a distance of 300 feet from lens 14 is adjusted by means of aperture stop 16. Each diffraction pattern at 300 feet from lens 14 is, for example, 0.1 inch in thickness.

Thus, the total height of the geometrical image plus the two diffraction patterns at a distance of 300 feet, in the example, from lens 14 is approximately 0.5 inch, while at a distance of 600 feet from lens 14 it is approximately 1.0 inch in height. Aperture stop 16 is adjusted to produce an entrance pupil 0.5 inch in height so that the total height of the projected light in front of lens 14 is the same as the total height of the projected light at 300 feet from lens 14. Thus, the light which corresponds to the geometrical image of slit 10 tapers from 0.5 inch at stop 16 to 0.3 inch at 300 feet from stop 16. The diffraction pattern on each side of the light which corresponds to the geometrical image is negligible at stop 16, but increases linealy with the distance from stop 16. Since the height of the light corresponding to the geometrical image decreases linearly with distance, while the height of each diffraction pattern increases linearly with distance, the height of the total light projected will be substantially constant over the entire design range of this invention.

Considering photosensitive device 8 as a photosensitive element, any light entering the field of view defined by the geometrical image of slit 10, as well as the diffraction pattern of slit 10, passes through stop 16, is refracted by means of lens 14 so as to pass through slit 10, and is applied to photosensitive device 8 by means of lens 12. Photosensitive device 8 is in the plane of the exit pupil, or image, of objective lens 14 so that any light passing through lens 14 is distributed over the sensitive surface of photosensitive device 8 independently of the portion of the field from which the light originates.

The height of the field of view 5 and 7 of each optical system is shown to the left of Fig. 2. The diagram of the field is broken in Fig. 2 to show both the components of the field adjacent stop 16 and the components of the field at the extremity of the design range (represented by a vertical line) of this invention. Thus, the portion to the left represents the field at a distance of 300 feet from lens 14, for example mentioned above. The total thickness of the field of view is represented by "$h$," while the height of the portion of the field of view which corresponds to the geometrical image of slit 10 is shown by "$g$," and the height of the diffraction pattern of slit 10 is shown by "$d$."

While the device of this invention is sensitive to a bright light which is directed at device 2, and is attached to the object or vehicle whose velocity is measured, the preferred embodiment of this invention utilizes a modulated or periodic intermittent light source which is reflected from the vehicle. The purpose of modulating or chopping the light is to identify that particular light in the presence of other sources of light, such as daylight. Thus, while all light within the field of view of the optical system passes through it, all signals from photosensitive device 8 except signals within the narrow band of frequencies adjacent the frequency of the modulated or intermittent light are stopped by suitable electrical filters, as shown in Fig. 8, to be described hereinafter. One means of providing a modulated or intermittent source of light upon the vehicle is to carry the light source and its associated modulating or chopping equipment, as well as the energy to operate the equipment. However, in the preferred embodiment of this invention, reflected light is utilized, and the only piece of equipment that is carried by the vehicle is retroflective element 3, such as a triple mirror or box corner mirror, as shown in Fig. 7.

Retroflective element 3, as shown in Fig. 7, has the property of reflecting intercepted light back to its source in a field four times the area of element 3. Thus, if a light source is provided along the axis of the optical systems shown in Fig. 2, any element, such as the type shown at 3 in Fig. 7, which intercepts the light from a light source, reflects the light back to its source at the entrance to the optical system. If retroflective element 3 is also within the field of view of the optical system, it generates a signal in photosensitive device 8.

A light projection system, which generates fans 4 and 6 of intermittent light along the axis of the optical systems shown in Fig. 2, is shown in Figs. 2, 4, 5, and 6. Fig. 3 is a side view of the light projection system in which the axes of the projected light from prisms 18 and 19 coincide with the axes of the optical systems of Fig. 2. Prism 19 is identical to prism 18, and cylindrical lens 21 is identical to cylindrical lens 20. Hence, the explanation of the projection of light in a single fan from prism 18 suffices to explain the projection of light from prism 19. The light from light source 22 is focused on the plane of chopper-disc 23 by means of lens 24. Light source 22 is enclosed in box 25 to prevent spurious radiation and glare. Reflector 26 reflects the light from light source 22 and increases the efficiency of utilization of the light emanating from light source 22. Chopper-disc 23, of which a plan view is shown in Fig. 6, is driven at a substantially constant speed by motor 27 through shaft 28. When one of slots 29 passes in front of lens 24 at the focal point of the light from light source 22, light is passed through chopper-disc 23. Slots 29 are spaced uniformly about the axis of disc 23 so that the frequency of the intermittent light which is passed through disc 23 is substantially constant. It is understood that the light to the left of chopper-disc 23 is no longer continuous but is intermittent and has a characteristic frequency which is determined by the spacing of slots 29 and the speed of rotation of disc 23. Lens 30 is placed close to disc 23 and focuses the light from light source 22 upon light splitting prism 31. Prism 31 is properly placed with respect to lens 30 to create the proper angle of divergence $\alpha$. The light is then projected transversely by prism 31 to prisms 18 and 19 through cylindrical lenses 20 and 21. The angle of divergance of the beam reflected from prism 31 is identical to the angle $\alpha$. Lens 20 does not affect the pattern of light in the plane of Fig. 3 but only in a plane perpendicular to the plane of Fig. 3, as shown in Figs 4 and 5, hereinafter explained. The light is then projected outward by prisms 18 and 19 in a diverging fan whose angle of divergence in the plane of Fig. 3 is equal to the angle $\alpha$. The angle $\alpha$ is sufficiently wide to illuminate the entire height of the field of view of each optical system of Fig. 2 outside of the minimum useful range of the device of this invention, and is narrow enough to provide sufficient intensity of illumination within the maximum design range of this invention. Thus, when retroflective element 3 in Fig. 7 comes within the field of view of the optical systems shown in Fig. 2, between the minimum and maximum useful range of this invention, it is adequately illuminated with light of the proper frequency to operate photosensitive devices 8 and 9, together with their associated electrical equipment to be presently described.

Light radiated into cylindrical lenses 20 and 21 is projected in a plane perpendicular to Fig. 3, as shown in Fig. 4 taken at 4—4 in Fig. 3. Light is projected onto cylindrical lens 20 at some angle $\beta$, normally equal to $\alpha$, and is focused by lens 20 upon prism 18 from whence it is projected outward at a very broad angle of divergence $\gamma$, for example 60°, as shown in Fig. 5.

Photosensitive devices 8 and 9 are electrically connected to amplifiers 32 and 33, respectively, as shown in Fig. 8. Amplifiers 32 and 33 amplify the signal from photosensitive devices 8 and 9 and are electrically connected to filters 34 and 35, respectively. Filters 34 and 35 allow only voltages of a particular band of frequencies centered about the frequency which was established by chopper-disc 23 to pass. The width of the band of frequencies is adjusted to an optimum value which is as narrow as possible to pass the desired signal without appreciable time lag and still eliminate a maximum amount of noise. Filters 34 and 35 are electrically connected to electronic switch 36, shown in detail in Fig. 9 and explained below. The signal from filter 34 closes switch 36, while the signal from filter 35 opens switch 36. In the preferred embodiment of this invention, constant current source 37 is electrically connected to electronic switch 36. Condenser-resistor circuit 38 is also connected to electronic switch 36. When switch 36 is closed, current from constant current source 37 flows into condenser-resistor circuit 38 and charges condenser 39 through resistor 40. Vacuum tube voltmeter 41 is connected across condenser 39 in condenser-resistor circuit 38. Electrical meter 42 is connected to vacuum tube voltmeter 41 and registers the voltages across condenser 39 of condenser-resistor circuit 38. Meter 42 is calibrated in terms of the velocity which is to be measured.

The details of electronic switch 36 are shown in Fig. 9. The signal from filter 34 triggers thyratron 43 which connects the high voltage across gas regulator tube 44 through current limiting resistor 45. The voltage across tube 44 is also across thyratron 47 and vacuum tube 46 which is, in turn, in series with condenser-resistor combination 38. The signal from filter 35 triggers thyratron 47 which shorts tubes 44 and 46 thereby causing tube 46 to stop conducting. Thus, condenser 39 in condenser-resistor combination 38 starts charging when a signal is applied to thyratron 43, and stops charging when a signal is applied to thyratron 47.

Thus, the device of this invention measures a single component of the average velocity of an object or vehicle, and is particularly adapted to measure the vertical velocity of an aircraft at the moment of touchdown of the aircraft upon a runway surface, such as an airport runway or an aircraft carrier deck.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for measuring a velocity component of a moving object, comprising a retroflective element upon said object; a first and second optical system spaced apart a predetermined distance, each said optical system having a field of view which has negligible thickness in the direction of said velocity component and extending transversely to said component; a stationary light source; a light-projecting system adapted to project light along the optical axes of said first and second optical systems; photosensitive devices associated with each said optical system respectively; a timer; and electrical means connected between said timer and said photosensitive devices for starting and stopping said timer whereby light projected from said light-projecting system is intercepted by said retroflective element and is reflected into said first and second optical systems energizing said first and second photosensitive devices consecutively whereby said timer is started by the signal from said first photosensitive device and stopped by the signal from said second photosensitive device, the measured component of velocity of said object being reciprocally related to the time registered by said timer.

2. A device as recited in claim 1 in which said timer comprises a constant current source, a resistor, and condenser in series; a vacuum tube voltmeter connected across said condenser; a voltage indicator connected to said vacuum tube voltmeter and calibrated in terms of velocity whereby when current starts to flow from said constant current source into said condenser a voltage is stored in said condenser, the time duration of said current flow being related to said voltage and reciprocally related to the velocity indicated upon said indicator.

3. A device as recited in claim 1 and further comprising means for modulating said projected light at a constant frequency, first and second filter means tuned to said frequency and connected between said first and second photosensitive device, respectively, and said timer whereby the modulated light reflected from said reflector is identified in the presence of other light signals.

4. A device as recited in claim 1 in which said electrical means connected between said timer and said photosensitive device comprises amplifying means in series with each said photosensitive device, and an electronic switch connected to both said amplifying means.

5. Means for measuring one component of velocity of an aircraft, comprising retroflective means attached to said aircraft, a source of light, stationary optical light-radiating means radiating two identical fans of light whose planes of symmetry are parallel to each other and perpendicular to said component, a pair of stationary optical light-sensing means whose axes coincide with the axes of said fans of light, a photosensitive device associated with each said optical sensing means, and a timer connected to said photosensitive devices for measuring the time between the interception of the field of view of said first stationary optical light-sensing means by said retroflective means, and the interception of the field of view of said second stationary optical light-sensing means by said retroflective means.

6. A device as recited in claim 5 and further comprising means for modulating the light from said source of light, and filter means connected between said photosensitive devices and said timer to prevent any light except the modulated radiated light reflected from said retroflective means from controlling said timer.

7. Means for measuring the vertical velocity of an aircraft, comprising a retroflective element attached to said aircraft; first and second parallel optical systems whose axes are spaced apart by a known vertical distance, the field of view of each said optical systems being extremely thin and of constant thickness in a vertical direction but broad in a horizontal direction; light projection means for projecting light into the said fields of said optical systems; light-sensitive means associated with each said optical system; and timing means for measuring the time between the interception of the first said field of view and the interception of the second said field of view by said retroflective means, the vertical velocity of said aircraft being inversely proportional to said measured time whereby the vertical component of velocity of an aircraft is measured in the presence of a horizontal component of velocity.

8. A device as recited in claim 7 and further comprising means for modulating said projected light, and filter means connected between said light-sensitive means and said timing means to prevent any light except the modulated projected light reflected from said retroflective means from controlling said timing means.

9. Means for measuring the velocity component of a moving object comprising a light source; means for projecting illumination from said light source into two fans of light along a pair of parallel axes; retroflective means connected to said object for reflecting said light back to its source when intercepted; a first and second optical system, each having a field of view which has negligible but constant thickness in the direction of said velocity component, said field of view extending transversely to said component through the axes of said light-projection system; light-sensitive devices associated with each said optical system for converting light signals into electrical signals; a timer; and electrical means connected between said timer and said light-sensitive devices for starting said timer when said retroflective means enters said field of view of said first optical system, and stopping said timer when said retroflective means enters said field of view of said second optical system, the velocity of said object being reciprocally related to the time registered by said timer.

10. A device as recited in claim 9 and further comprising means for modulating said projected illumination at a constant frequency, first and second filter means tuned to said frequency and connected between said first and second photosensitive devices, respectively, and said timer whereby the modulated light reflected from said retroflective means is identified in the presence of other light signals.

11. A device as recited in claim 9 in which said means for projecting illumination from said light source into two fans of light along a pair of parallel axes comprises optical beam splitting means, optical lens means between said light source and said beam splitting means, said light being reflected from said beam splitting means in two directions toward the planes of said fans of light, optical lens means between said beam splitter and the planes of said fans of light to disperse said light by a predetermined amount, and reflecting means within the planes of said fans of light to reflect said light outward into said fans of light whereby said fans of light have a thickness which depends upon the angle of incidence to said beam splitting means and have a spread which depends upon said dispersion lens means.

12. A device as recited in claim 9 in which said optical system comprises a light-collecting lens, a first optical stop adjusted to the desired thickness of said field of view positioned in front of said light-collecting lens, a second optical stop positioned behind said light-collecting lens at a distance to cause said collecting lens to focus said light upon the slit of said stop, a second lens positioned behind said second stop to collect the light passing through said second stop and to project said light upon said light-sensitive device, the plane of said light-sensitive device being upon the plane of the exit pupil of said optical system.

13. A device as recited in claim 9 in which said optical system comprises a first optical stop adjusted to the desired thickness of said field of view, positioned in front of said light-collecting lens, a second optical stop positioned behind said light-collecting lens so that said lens focuses said light upon said stop, having a slit which is a predetermined thickness to cause the diffraction pattern of said slit to supplement the geometrical image of said slit and to cause the field of view of said optical system to be a desired predetermined constant thickness for a predetermined distance outward from said light-collecting lens, and a second lens behind said second stop to collect the light which passes through said slit and to project said light upon said light-sensitive device.

14. An optical system which has a field of view which is of constant thickness within a predetermined distance from said optical system comprising a first optical stop which has an opening equal to the desired predetermined thickness of said field of view, a second optical stop having a slit adjusted to a predetermined size to cause the diffraction pattern of said slit to just supplement the optical image of said slit to cause said field of view to be of constant thickness within said predetermined range, and a lens behind said first stop focused upon the slit of said second optical stop.

References Cited in the file of this patent

UNITED STATES PATENTS

| | | |
|---|---|---|
| 835,648 | Straubel | Nov. 13, 1906 |
| 1,946,290 | Lord | Feb. 6, 1934 |
| 2,409,672 | Fischer et al. | Oct. 22, 1946 |
| 2,442,690 | Hoffman et al. | June 1, 1948 |
| 2,497,541 | Ferrar | Feb. 14, 1950 |

FOREIGN PATENTS

| | | |
|---|---|---|
| 560,603 | Great Britain | Apr. 12, 1944 |